United States Patent
Bahei-Eldin et al.

(10) Patent No.: US 11,764,584 B1
(45) Date of Patent: Sep. 19, 2023

(54) MULTIPURPOSE INVERTER WITH FLEXIBLE PORTS

(71) Applicant: RIVIAN IP HOLDINGS, LLC, Irvine, CA (US)

(72) Inventors: Khaled Yehia Bahei-Eldin, Irvine, CA (US); Deidre Emily Yiu, San Francisco, CA (US)

(73) Assignee: RIVIAN IP HOLDINGS, LLC, Irvine, CA (US)

( * ) Notice: Subject to any disclaimer, the term of this patent is extended or adjusted under 35 U.S.C. 154(b) by 0 days.

(21) Appl. No.: 17/859,807

(22) Filed: Jul. 7, 2022

(51) Int. Cl.
*H02J 3/38* (2006.01)
*H02J 7/35* (2006.01)
*B60L 53/51* (2019.01)

(52) U.S. Cl.
CPC .............. *H02J 3/381* (2013.01); *B60L 53/51* (2019.02); *H02J 7/35* (2013.01); *B60L 2210/10* (2013.01); *B60L 2210/30* (2013.01); *H02J 2207/20* (2020.01); *H02J 2300/26* (2020.01)

(58) Field of Classification Search
CPC ...... H02J 3/38; H02J 3/381; H02J 7/35; H02J 2207/20; H02J 2300/26; B60L 53/51
See application file for complete search history.

(56) References Cited

U.S. PATENT DOCUMENTS

2018/0076663 A1* 3/2018 Gudgel .................... H02J 7/35

* cited by examiner

*Primary Examiner* — Robert L Deberadinis
(74) *Attorney, Agent, or Firm* — Haley Guiliano LLP

(57) ABSTRACT

A modular inverter is disclosed that provides users flexibility in which devices can be installed in their system by supporting a plurality of different types of DC-to-DC converters, where each DC-to-DC converter corresponds to one of a plurality of loads. The modular inverter houses the plurality of different types of DC-to-DC converters in a plurality of bays, which couples each DC-to-DC converter to a DC rail to either receive or deliver DC power.

20 Claims, 5 Drawing Sheets

MULTIPURPOSE INVERTER WITH FLEXIBLE PORTS

INTRODUCTION

The present disclosure relates to a modular inverter that provides users flexibility in which devices they install in their system, while still using the same inverter platform. More particularly, the present disclosure relates to a modular inverter that supports a plurality of different types of direct current-to-direct current (DC-to-DC) converters, which each correspond to one of a plurality of loads.

SUMMARY

Home power inverters are becoming increasingly prevalent with the growing popularity of smart homes, the growing popularity of electric vehicles (EVs), and a newfound realization that users can control their power consumption while not having to rely on the power grid. For example, if a homeowner with a home power inverter lives in an area where a power grid blackout takes place, they may rely on stored power taken from either the power grid or from a solar panel attached to their house until the power grid turns back on. In some embodiments, the homeowner may couple a first stationary battery converter to the home power inverter, charge the battery with either power from the power grid or the coupled solar panel, and store the battery in case of emergency (e.g., a power grid blackout), in which case the homeowner may couple the battery to the home power inverter to power their home. However, if the homeowner wished to power their home with a second stationary battery converter with different power, voltage, or current parameters, the homeowner would be unable to do so, as inputs for home power inverters available today are fixed and only capable of receiving a single type of a device. Similarly, if the homeowner desired to charge a second electric vehicle with Level 3 charging, they would be unable to do so if their home power inverter were only compatible with Level 2 charging for a first electric vehicle. Home power inverters today are fixed and incapable of interchanging inputs, which limits their usability and potential as a product.

Systems and methods are described herein for a modular inverter that supports a plurality of different types of DC-to-DC converters, which each correspond to one of a plurality of loads (e.g., an electric vehicle or a stationary battery converter). The modular inverter couples to an alternating current (AC) power source (e.g., the power grid) via an AC rail, which receives AC power and delivers the AC power to a bi-directional AC-to-DC inverter. The AC-to-DC inverter converts the AC power to DC power and delivers the DC power, via a DC rail, to one of a plurality of bays, which each house a DC-to-DC converter. Although figures disclosed herein depict example diagrams of the modular inverter with four bays, it will be understood that the modular inverter may include any suitable number of bays. In some embodiments, electrical connectors couple each DC-to-DC converter to the DC rail and are sized to handle the largest power limit in a range of power limits of present DC-to-DC converters in the modular inverter at any point in time. It will be understood that the modular inverter may include any suitable number of DC-to-DC inverters. Each DC-to-DC converter couples to the one of the plurality of loads and, accordingly, delivers the DC power to their respective load. In some embodiments, a respective load (e.g., an electric vehicle or a stationary battery converter) coupled to a DC-to-DC converter may be used to provide DC power to the modular inverter, which may either power a separate load coupled to the modular inverter or be repurposed as AC power, via the bi-directional AC-to-DC inverter, to power a residence. In some embodiments, one of the bays houses a maximum power point tracking (MPPT) charge controller, which couples to a solar panel. The solar panel receives solar energy, converts the solar energy to DC power, and delivers the DC power to the modular inverter via a unidirectional portion of the DC rail. It will be understood that the modular inverter may include any suitable number of MPPT charge controllers.

In some embodiments, the modular inverter further includes control circuitry, which couples to DC-to-DC converters, and a MPPT charge controller, housed in the bays of the modular inverter via a bi-directional signal rail. It will be understood that the signal rail may couple to any suitable number of DC-to-DC converters or MPPT charge controllers. The control circuitry receives an identifier, which identifies a load connected to a DC-to-DC controller, from the DC-to-DC controller, via the signal rail, and applies a setting (e.g., a voltage limit, a current limit, or a power limit) associated with the DC-to-DC converter based on the identifier. For example, the DC-to-DC converter may communicate to control circuitry, via an identifier, that an electric vehicle currently coupled to the modular inverter is compatible to a Level 3 charger. Accordingly, the control circuitry applies this power delivery setting by, for example, electrically coupling, via one or more contactors, at least one of the plurality of fuses in a parallel configuration to the DC-to-DC converter. In some embodiments, a software communication protocol (e.g., Modbus or gRPC) delivers the identifier from the DC-to-DC converter, housed in one of the plurality of bays, to the control circuitry. In some embodiments, control circuitry selects stored protection and control limits for a load (e.g., an electric vehicle or a stationary battery converter) from a memory of the modular inverter, where the control circuitry selects the stored protection and control limits based on an identifier of the load delivered by the DC-to-DC converter. In some embodiments, the applied setting by the control circuitry includes the selected protection and control limits. In some embodiments, the modular inverter further includes an inverter communications component, which may wirelessly couple to a user device or a service team device (e.g., a smart mobile phone or a smart tablet) via a software interface (e.g., a modular inverter application). The inverter communications component may allow a user or a service team to monitor residential power usage as well as a variety of inputs coupled to the modular inverter. In some embodiments, the inverter communications component may alert the user or service team of a malfunction within the modular inverter.

In some embodiments, a non-transitory computer-readable medium is disclosed herein having non-transitory computer-readable instructions encoded thereon that, when executed by a processor (e.g., control circuitry), causes the processor to convert AC power to DC power and deliver the DC power, via a DC rail, to one of a plurality of bays, which each house a DC-to-DC converter.

BRIEF DESCRIPTION OF DRAWINGS

The above and other features of the present disclosure, its nature, and various advantages will be more apparent upon consideration of the following detailed description, taken in conjunction with the accompanying drawings in which.

DETAILED DESCRIPTION OF DRAWINGS

In some embodiments, the present disclosure relates to a modular inverter that supports a plurality of different types of DC-to-DC converters, which each correspond to one of a plurality of loads (e.g., an electric vehicle or a stationary battery converter). The modular inverter couples to an AC power source (e.g., the power grid) via an AC rail, which receives AC power and delivers the AC power to a bi-directional AC-to-DC inverter. The AC-to-DC inverter converts the AC power to DC power and delivers the DC power, via a DC rail, to one of a plurality of bays, which each house a DC-to-DC converter. Although figures disclosed herein depict example diagrams of the modular inverter with four bays, it will be understood that the modular inverter may include any suitable number of bays. In some embodiments, electrical connectors couple each DC-to-DC converter to the DC rail and are sized to handle the largest power limit in a range of power limits of present DC-to-DC converters in the modular inverter at any point in time. It will be understood that the modular inverter may include any suitable number of DC-to-DC inverters. Each DC-to-DC converter couples to the one of the plurality of loads and, accordingly, delivers the DC power to their respective load. In some embodiments, a respective load (e.g., an electric vehicle or a stationary battery converter) coupled to a DC-to-DC converter may be used to provide DC power to the modular inverter, which may either power a separate load coupled to the modular inverter or be repurposed as AC power, via the bi-directional AC-to-DC inverter, to power a residence. It will be understood that the present disclosure is not limited to any residential size and may be used for any suitable home or facility. In some embodiments, one of the bays houses a maximum power point tracking (MPPT) charge controller, which couples to a solar panel. The solar panel receives solar energy, converts the solar energy to DC power, and delivers the DC power to the modular inverter via a unidirectional portion of the DC rail. It will be understood that the modular inverter may include any suitable number of MPPT charge controllers.

Figure 1:
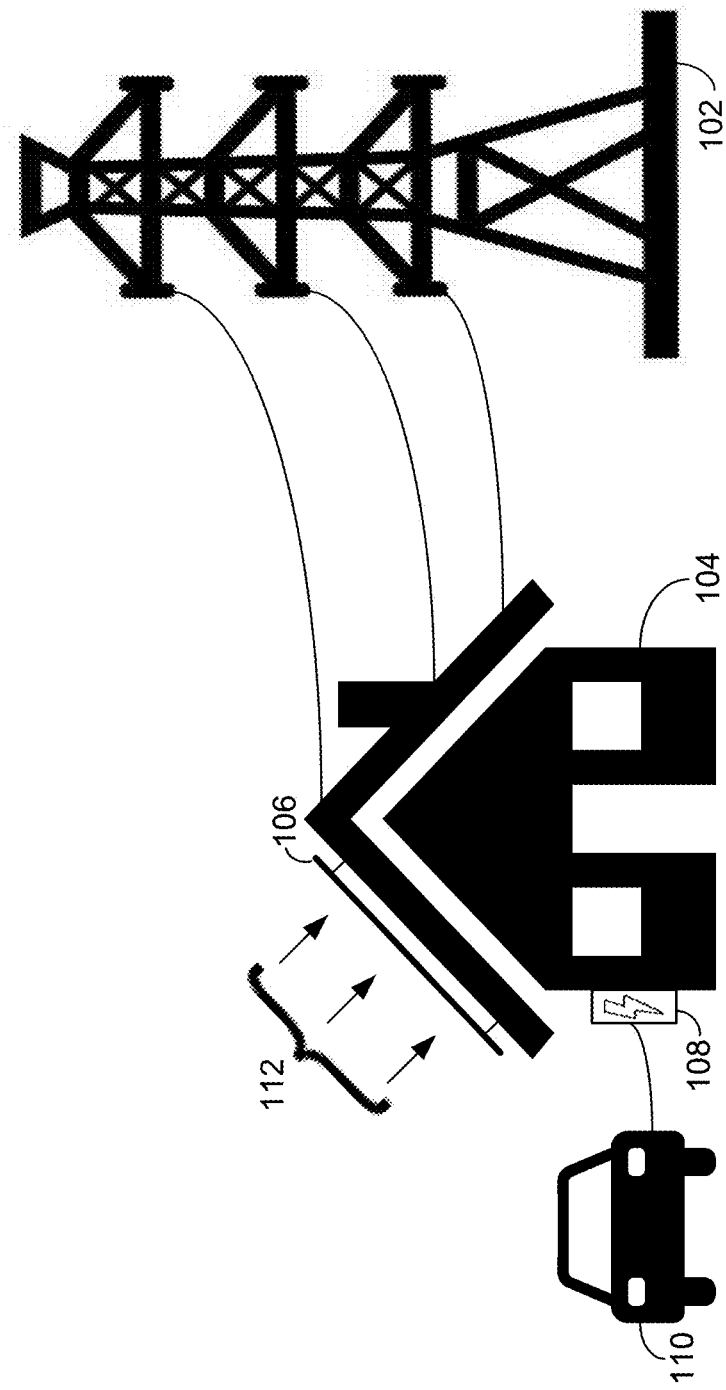
FIG. 1 shows an illustrative modular inverter system implemented with a residence, in accordance with an embodiment of the present disclosure.

FIG. 1 shows an illustrative modular inverter system 100 implemented with a residence, in accordance with an embodiment of the present disclosure. Modular inverter system 100 includes an AC power source 102 (e.g., the power grid), a residence 104, a solar panel 106, which receives solar energy 112, a modular inverter 108, and an electric vehicle 110. Although particular components are depicted in FIG. 1, it will be understood that other suitable inputs may be coupled to the modular inverter 108 (e.g., a stationary battery converter) and any suitable AC power source 102 may be implemented in the modular inverter system 100. In some embodiments, multiple different inputs (e.g., the electric vehicle 110 and a stationary battery converter) may be concurrently coupled to the modular inverter 108. It will be understood that while solar panel 106 unidirectionally couples to the modular inverter 108 (e.g., only delivers DC power) via a DC rail, electric vehicle 110, and any other suitable load coupled to the modular inverter 108, bi-directionally couples to the modular inverter 108 (e.g., may deliver DC power or may receive DC power) via the DC rail.

AC power source 102 (e.g., the power grid) couples to the modular inverter 108 and provides AC power, via a bi-directional AC rail, to the residence 104. In some embodiments, while the modular inverter 108 typically receives AC power via the AC rail, converts the AC power to DC power, and charges respective loads (e.g., the electric vehicle 110 or a stationary battery converter) coupled to the modular inverter 108 with the DC power, the modular inverter 108 may convert received DC power to AC power and power the residence 104 via the AC rail. It will be understood that the AC power source 102 may be susceptible to power grid blackouts, in which case the residence 104 would have to rely on stored power in the modular inverter 108 or loads delivering DC power to the modular inverter 108 to power the residence 104. As shown, solar panel 106 attaches to a roof of the residence 104, receives solar energy 112, converts the solar energy 112 to DC power, and delivers the DC power to the modular inverter 108 via a unidirectional portion of the DC rail (e.g., only delivers and cannot receive DC power). In some embodiments, solar panel 106 may be detached from the residence 104 and oriented in any suitable position to receive a maximum amount of solar energy 112. In some embodiments, solar panel 106 may rotate throughout the day to track the sun and receive an optimal amount of solar energy 112. Solar panel 106 couples to a maximum power point tracking (MPPT) charge controller located in one of a plurality of bays in the modular inverter 108. It will be understood that any suitable number of MPPT charge controllers may be included in the modular inverter 108. Modular inverter 108, which attaches to residence 104, receives AC power from AC power source 102 via the AC rail, which couples to an AC-to-DC converter within the modular inverter 108. Modular inverter 108 receives DC power from solar panel 106 via the DC rail, which couples to the MPPT charge controller located in the one of the plurality of bays in the modular inverter 108. Modular inverter 108 additionally receives DC power from the electric vehicle 110 via a bi-directional DC rail, which couples to a DC-to-DC converter housed in the one of the plurality of bays in the modular inverter 108. In some embodiments, the electric vehicle 110 receives DC power (e.g., from solar panel 106 or AC power source 102) from the modular inverter 108 via the DC rail. In some embodiments, modular inverter 108 may couple to any suitable load (e.g., a stationary battery converter) and any suitable number of loads. For example, if electric vehicle 110 and a stationary battery converter were both coupled to modular inverter 108, the electric vehicle 110 may deliver DC power to the stationary battery converter or the stationary battery converter may deliver DC power to the electric vehicle 110. In some embodiments, modular inverter 108 may power residence 104 with either the DC power from electric vehicle 110 or the DC power from solar panel 106.

Figure 2:
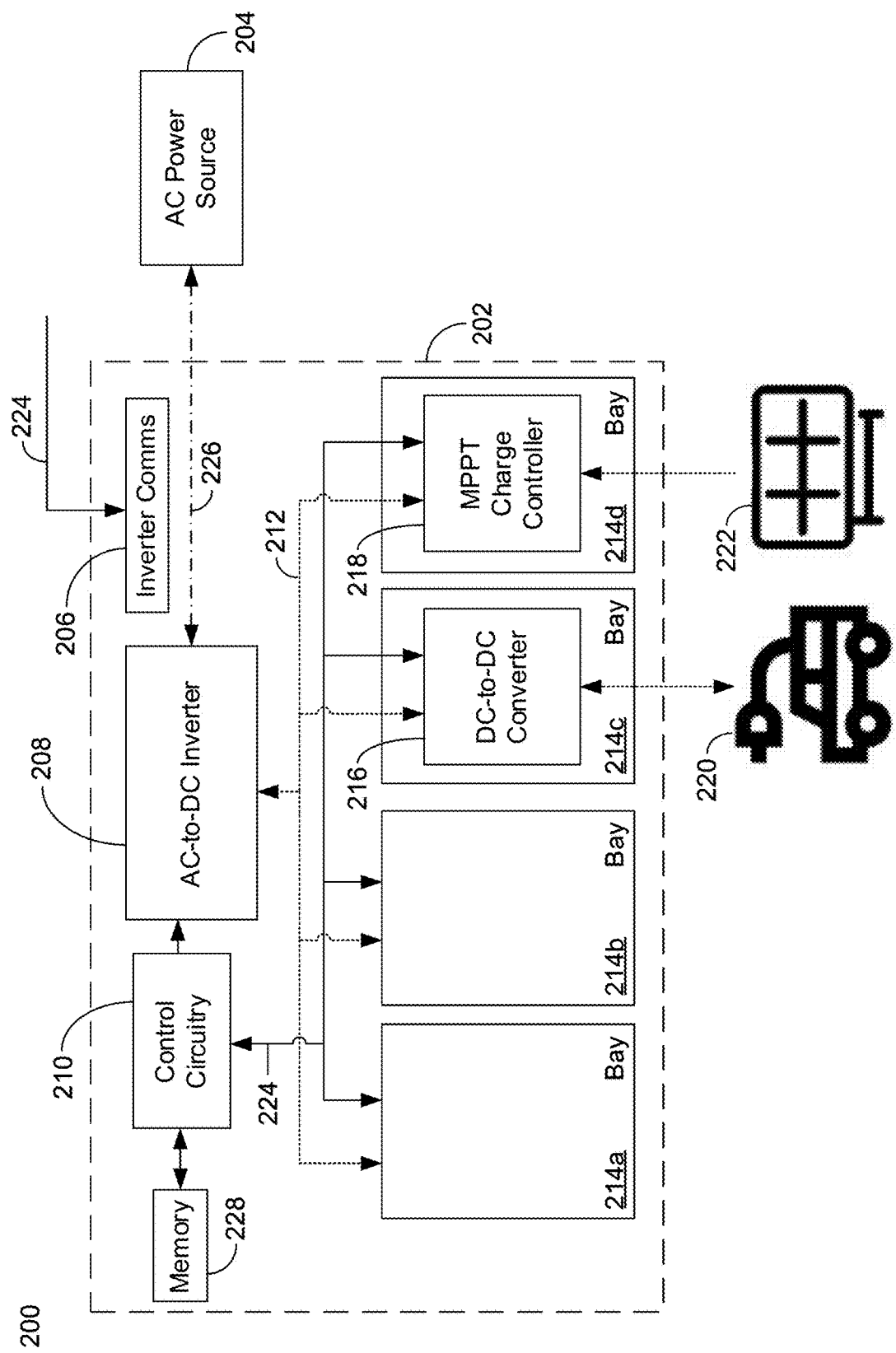
FIG. 2 shows an illustrative modular inverter with available bays, in accordance with an embodiment of the present disclosure.

FIG. 2 shows an illustrative modular inverter with available bays, in accordance with an embodiment of the present disclosure. System 200 includes a modular inverter 202 (e.g., corresponding to modular inverter 108 of FIG. 1), an AC power source 204 (e.g., corresponding to AC power source 102 of FIG. 1), an inverter communications (comms) 206, an AC-to-DC inverter 208, control circuitry 210, a DC rail 212, bays 214a-214d, a DC-to-DC converter 216, a MPPT charge controller 218, an electric vehicle 220 (e.g., corresponding to electric vehicle 110 of FIG. 1), a solar panel 222 (e.g., corresponding to solar panel 106 of FIG. 1), a signal rail 224, an AC rail 226, and a memory 228. It will be understood that FIG. 2 is an illustrative embodiment of a modular inverter system, so any featured component may be modified or substituted in accordance with the present disclosure.

Modular inverter 202 houses the system components mentioned above except for the electrical car 220 and solar panel 222, which each serve as inputs to the modular inverter 202, and the AC power source 204. Modular inverter 202 receives AC power from AC power source 204 via the bi-directional AC rail 226 (e.g., may deliver AC power or may receive AC power), receives DC power from solar panel 22 via a unidirectional portion of DC rail 212 (e.g., only delivers DC power), which couples to the MPPT charge controller 218, and receives DC power from electric vehicle 220 via the bi-directional DC rail 212 (e.g., may deliver DC power or may receive DC power), which couples to the DC-to-DC converter 216. In some embodiments, modular inverter 202 may deliver DC power to the electric vehicle 220 via the DC rail 212. In some embodiments, modular inverter 202 may deliver AC power to a residence via the AC rail 226. In some embodiments, modular inverter 202 may deliver DC power to the electric vehicle 220 via DC rail 212, where the DC power originates from either solar panel 222 or AC power source 204. It will be understood that there may be any suitable number of loads coupled to the modular inverter 202 of any suitable type (e.g., a stationary battery converter, an electric vehicle of any charging level, or any renewable energy source). In some embodiments, modular inverter 202 further includes, as described in more detail below, a plurality of fuses, where each fuse couples in series with a contactor, coupled in parallel with respect to each other. Although FIG. 2 depicts control circuitry 210 located internally with respect to modular inverter 202, it will be understood that control circuitry 210 may be external to the modular inverter 202. In some embodiments, modular inverter 202 includes the memory 228 that stores protection and control limits for a coupled load (e.g., electric vehicle 220 or a stationary battery converter).

Memory 228 may include hardware elements for non-transitory storage of commands or instructions, that, when executed by control circuitry 210, cause AC-to-DC inverter 208, DC-to-DC converter 216, or MPPT charge controller 218 to operate modular inverter 202 in accordance with embodiments described herein. Control circuitry may be communicatively coupled to components of modular inverter 202 via signal rail 224 or via a wireless connection.

AC power source 204 couples to the AC-to-DC inverter 208, via AC rail 226, and provides AC power from, for example, the power grid. In some embodiments, the AC power source 204 may experience a blackout, in which case the modular inverter 202 would provide power to a residence from a stored provision of DC power, DC power delivered by the solar panel 222, or DC power delivered by the electric vehicle 220. Inverter communications (comms) 206 wirelessly couples to an external user device or service team device (e.g., a smart mobile phone or a smart tablet) via a software interface (e.g., a modular inverter application). It will be understood that the inverter comms 206 may connect to an external monitoring device via signal rail 224. In some embodiments, inverter comms 206 may allow the user or service team to monitor power usage of the residence and various inputs coupled to the modular inverter 202 (e.g., electric vehicle 220, solar panel 222, or a stationary battery converter). In some embodiments, inverter comms 206 may alert the user or service team of a malfunction within the modular inverter 202 (e.g., an unsecured load not fully connected to the modular inverter 202 or a contactor failing to actuate so a corresponding fuse cannot couple to a DC-to-DC converter). AC-to-DC inverter 208 receives AC power from AC power source 204, via AC rail 226, and converts the AC power to DC power. Accordingly, AC-to-DC inverter 208 delivers the DC power to DC-to-DC converter 216 via DC rail 212. AC-to-DC inverter 208 offers bi-directional capability, so, in some embodiments, AC-to-DC inverter 208 may receive DC power, via DC rail 212, from a load (e.g., solar panel 222, electric vehicle 220, or a stationary battery converter), convert the DC power to AC power, and deliver the AC power to a residence, via AC rail 226. It will be understood that AC-to-DC inverter 208 may couple to any suitable number of DC-to-DC converters and MPPT charge controllers.

Control circuitry 210 couples to AC-to-DC inverter 208, DC-to-DC converter 216, and MPPT charge controller 218 via signal rail 224. It will be understood that control circuitry 210 may couple to any suitable number of DC-to-DC converters and MPPT charge controllers. Control circuitry 210 receives an identifier, which identifies a load (e.g., electric vehicle 220) connected to DC-to-DC converter 216, from the DC-to-DC converter 216 via signal rail 224 and applies a setting associated with the DC-to-DC converter 216 based on the identifier. In some embodiments, a software communication protocol (e.g., Modbus or gRPC) delivers identifiers from the plurality of DC-to-DC converters housed in the plurality of bays to control circuitry 210. In some embodiments, the applied setting includes one or more of a current limit, a voltage limit, or a power limit. In some embodiments, control circuitry 210 applies the setting based on the identifier by electrically coupling, using one or more contactors, at least one of the plurality of fuses in a parallel configuration to the received DC-to-DC converter 216. For example, DC-to-DC converter 216 may communicate to control circuitry 210, via an identifier, that the electric vehicle 220 currently coupled to the modular inverter 202 is compatible to a Level 3 charger. Accordingly, control circuitry 210 applies a power delivery setting corresponding to the power range of 3.7 to 17.2 kW by electrically coupling, via one or more contactors, at least one of the plurality of fuses in a parallel configuration to the DC-to-DC converter 216. It will be understood that if a user desired to couple a second electric vehicle in place of electric vehicle 220 with a different charging level (e.g., Level 3), the user would have to replace DC-to-DC converter 216 with a compatible DC-to-DC converter. In some embodiments, control circuitry 210 selects stored protection and control limits for a load (e.g., electric vehicle 220 or a stationary battery converter) from memory 228 of the modular inverter 202, where the control circuitry 210 selects the stored protection and control limits based on an identifier of the load delivered by the DC-to-DC converter 216. In some embodiments, the applied setting includes the selected protection and control limits. In some embodiments, control circuitry 210 selects stored protection and control limits based on coupled loads and applies the selected protection and control limits to AC-to-DC inverter 208.

DC rail 212 couples AC-to-DC inverter 208 to DC-to-DC converter 216 and to MPPT charge controller 218. DC rail 212 couples to DC-to-DC converter 216 via an electrical connector, where in some embodiments the connector is sized to handle a largest power limit of the DC-to-DC converter 216. For example, if modular inverter 202 is compatible with a Level 3 electric vehicle charger, the electrical connector is sized to handle the power limit of the Home Level 3 charger (e.g., up to 25 kW). Accordingly, any Level 3-compatible DC-to-DC converter or any DC-to-DC converter with a smaller power limit may be used in modular inverter 202. In some embodiments where there are multiple DC-to-DC converters due to there being multiple loads, a plurality of electrical connectors may connect the DC rail 212 to each DC-to-DC converter, where each of the plurality of electrical connectors is sized to handle a largest power limit in a range of power limits of the multiple DC-to-DC converters. Bays 214a, 214b are empty in FIG. 2, while bay 214c houses DC-to-DC converter 216 and bay 214d houses MPPT charge controller 218. In some embodiments, bays 214a, 214b house respective DC-to-DC converters. In some embodiments, modular inverter 202 includes any suitable number of bays. Bay 214c couples DC-to-DC controller 216 to DC rail 212, via an electrical connector, and to signal rail 224. Bay 214d couples MPPT charge controller 218 to DC rail 212 and to signal rail 224. It will be understood that each of the plurality of bays 214a-214d is capable of receiving a plurality of different types of DC-to-DC converters, where each DC-to-DC converter corresponds to one of a plurality of loads. While FIG. 2 depicts DC-to-DC converter 216 being housed by bay 214c, it will be understood that any bay 214a-214c or 214a-214d may house DC-to-DC converter 216. DC-to-DC converter 216 delivers an identifier, which identifies electric vehicle 220 coupled to DC-to-DC converter 216, to control circuitry 210 via signal rail 224. Accordingly, in some embodiments, DC-to-DC converter 216 receives an applied setting (e.g., a current limit, a voltage limit, or a power limit) from control circuitry 210 corresponding to electric vehicle 220 based on the identifier. For example, if electric vehicle 220 is compatible with a Level 3 charger, which provides up to 25 kW of power delivery, control circuitry 210 will apply a power delivery limit of 25 kW. In some embodiments, the applied setting, which includes protection and control limits (e.g., a current limit, a voltage limit, or a power limit), is stored in memory 228 of the modular inverter 202. DC-to-DC converter 216 couples to DC rail 212 via electrical connector, receives DC power from DC rail 212, and delivers the DC power to electric vehicle 220. In some embodiments, DC-to-DC converter 216 receives DC power from electric vehicle 220 and delivers the DC power to DC rail 212 via electrical connector.

While FIG. 2 depicts MPPT charge controller 218 being housed by bay 214d, it will be understood that any bay 214a-214d may house MPPT charge controller 218. MPPT charge controller 218 receives DC power from solar panel 222, via a unidirectional portion of DC rail 212 (e.g., may only deliver DC power), and delivers the DC power to DC rail 212. Signal rail 224 couples control circuitry 210 to DC-to-DC converter 216 and to MPPT charge controller 218. It will be understood that signal rail 224 may couple to any suitable number of DC-to-DC converters or MPPT charge controllers housed in modular inverter 202.

Figure 3:
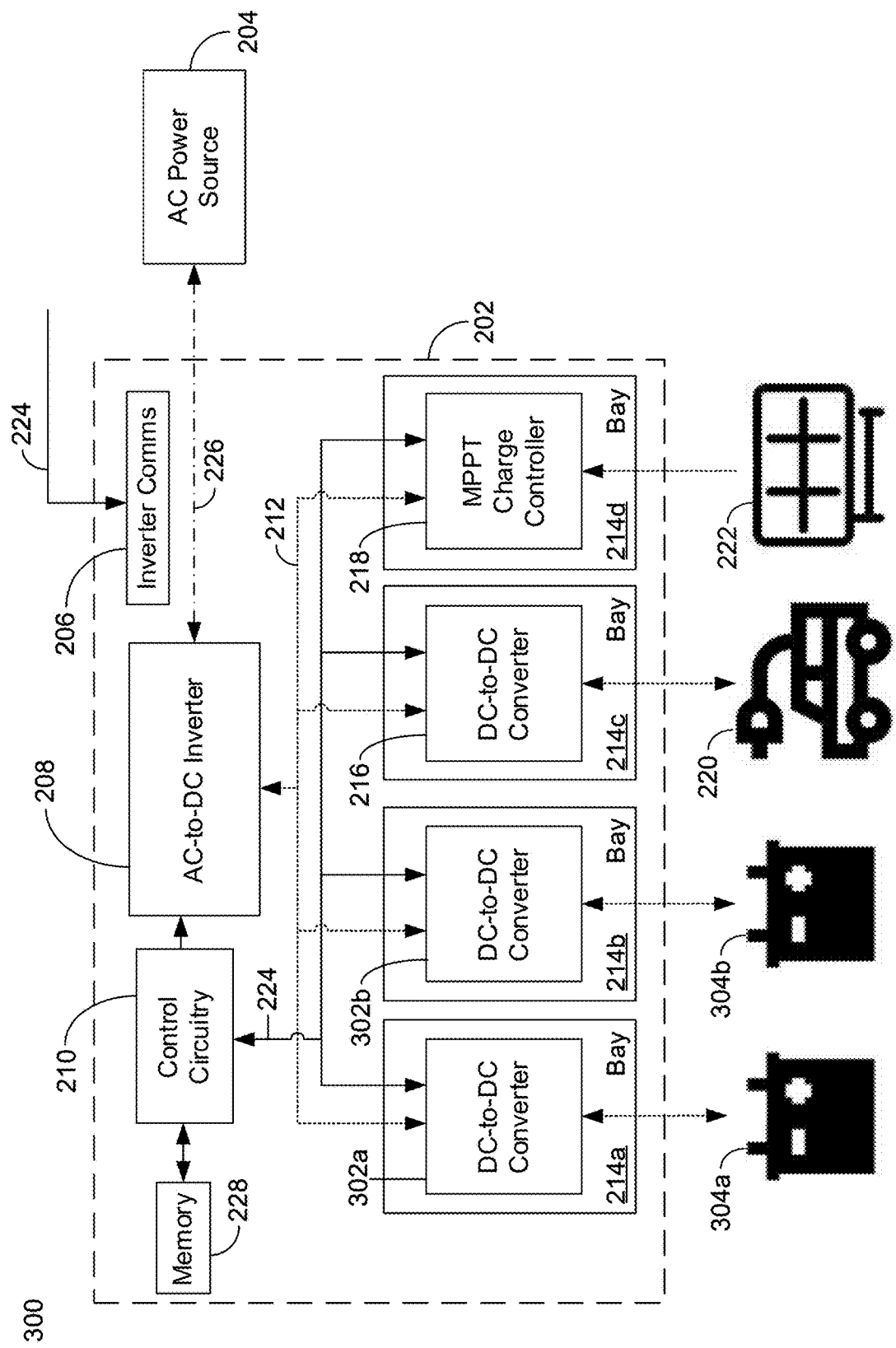
FIG. 3 shows an illustrative modular inverter with filled bays, in accordance with an embodiment of the present disclosure.

FIG. 3 shows an illustrative modular inverter with filled bays, in accordance with an embodiment of the present disclosure. System 300 includes modular inverter 202, AC power source 204, inverter comms 206, AC-to-DC inverter 208, control circuitry 210, DC rail 212, bays 214a-214d, DC-to-DC converter 216, MPPT charge controller 218, electric vehicle 220, solar panel 222, signal rail 224, AC rail 226, and memory 228 of system 200. In addition, system 300 includes DC-to-DC converters 302a, 302b (each, in some embodiments, corresponding to DC-to-DC converter 216) and stationary battery converters 304a, 304b. It will be understood that FIG. 3 is an exemplary embodiment of the system 300, so any featured component may be modified or substituted.

While FIG. 3 depicts DC-to-DC converters 302a, 302b being housed by bays 214a, 214b, it will be understood that any bay 214a-214d may house DC-to-DC converters 302a, 302b. DC-to-DC converters 302a, 302b each deliver an identifier, which identifies stationary battery converters 304a, 304b, respectively, coupled to DC-to-DC converters 302a, 302b, to control circuitry 210 via signal rail 224. Accordingly, in some embodiments, DC-to-DC converters 302a, 302b each receive an applied setting (e.g., a current limit, a voltage limit, or a power limit) from control circuitry 210 corresponding to stationary battery converters 304a, 304b based on each identifier. For example, if stationary battery converter 304a can deliver up to 400 W of peak power with 320 W of continuous output, control circuitry 210 will apply a power delivery limit of 400 W to DC-to-DC converter 302a. In another example, if stationary battery converter 304b can deliver up to 6,000 W of peak power with 3,000 W of continuous output, control circuitry 210 will apply a power deliver limit of 6,000 W to DC-to-DC converter 302b. It will be understood that if a user desired to couple a different stationary batter converter in place of either stationary battery converter 304a, 304b, the user may need to replace either DC-to-DC converter 302a, 302b with a compatible DC-to-DC converter. In some embodiments, the applied setting, which includes protection and control limits (e.g., a current limit, a voltage limit, or a power limit), is stored in memory 228 of the modular inverter 202. DC-to-DC converters 302a, 302b couple to DC rail 212 via respective electrical connectors, receive DC power from DC rail 212, and deliver the DC power to respective stationary battery converters 304a, 304b. In some embodiments, DC-to-DC converters 302a, 302b receive DC power from respective stationary battery converters 304a, 304b and deliver the DC power to DC rail 212 via respective electrical connectors. Stationary battery converters 304a, 304b respectively couple to DC-to-DC converters 302a, 302b via bi-directional portions of DC rail 212 (e.g., may deliver DC power or may receive DC power). It will be understood that any suitable load and any suitable number of loads may couple to modular inverter 202.

Figure 4:
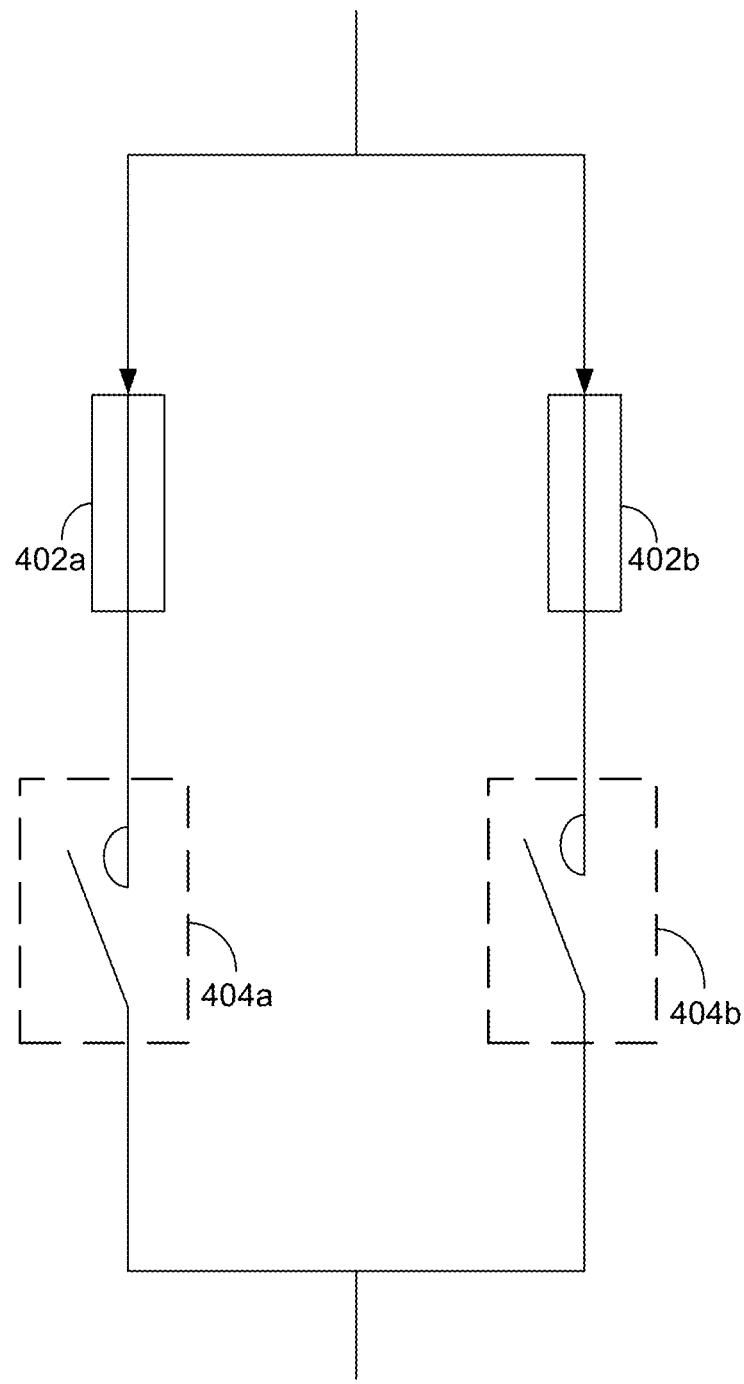
FIG. 4 shows an illustrative fuse and contactor configuration, in accordance with an embodiment of the present disclosure.

FIG. 4 shows an illustrative fuse and contactor configuration, in accordance with an embodiment of the present disclosure. System 400 includes a fuse 402a coupled in series with a contactor 404a, where their electrical coupling is oriented in parallel with a fuse 402b coupled in series with a contactor 404b. It will be understood that FIG. 4 is an exemplary depiction of a fuse and contactor configuration for the present disclosure, and any suitable fuse and contactor configuration may be used for the invention disclosed herein. In some embodiments, any suitable number of fuses and any suitable number of contactors may be incorporated with the modular inverter disclosed herein. In some embodiments, the fuse and contactor configuration depicted by system 400 is used by control circuitry to apply a setting to a DC-to-DC converter based on an identifier sent by the DC-to-DC converter to control circuitry identifying a load (e.g., an electric vehicle, a stationary battery converter, a solar panel) coupled to the DC-to-DC converter. Control circuitry applies the setting (e.g., a voltage limit, a current limit, or a power limit) by electrically coupling, via activating contactors 404a, 404b, one of fuses 402a, 402b to the DC-to-DC converter that delivers the identifier. In some embodiments, system 400 may include three fuse settings: fuse 402a solely connected, fuse 402b solely connected, or both fuses 402a and 402b concurrently connected. If the modular inverter were to malfunction and an excess amount of current, voltage, or power were to be delivered, one of the coupled fuses 402a, 402b would activate and prevent any damage to the load.

Figure 5:
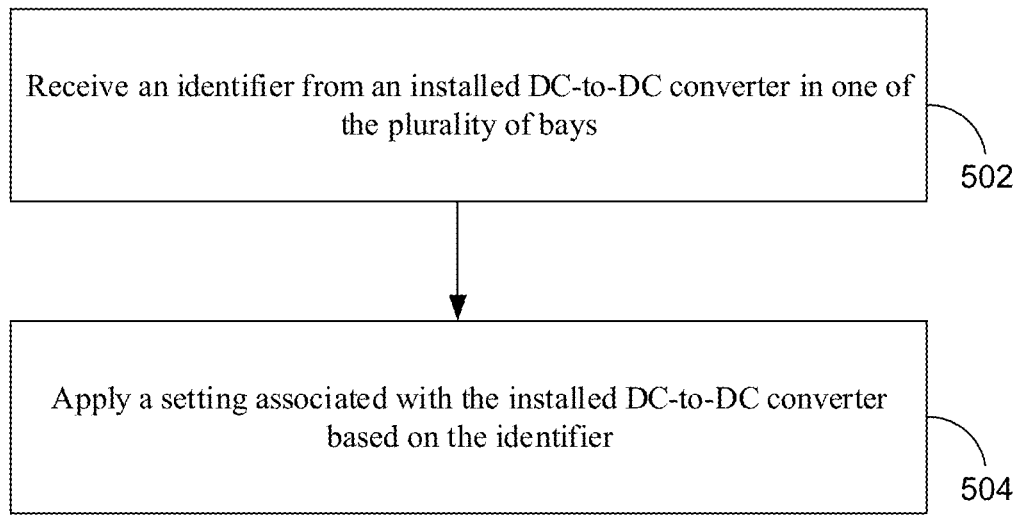
FIG. 5 shows an illustrative flowchart depicting an exemplary process for operating a modular inverter, in accordance with an embodiment of the present disclosure.

FIG. 5 shows an illustrative flowchart depicting an exemplary process 500 for operating a modular inverter, in accordance with an embodiment of the present disclosure. Process 500 includes step 502, where control circuitry 210 receives an identifier (e.g., identifying a load coupled to an installed DC-to-DC converter) from an installed DC-to-DC converter in one of the plurality of bays, and step 504, where, in response to step 502, control circuitry 210 applies a setting associated with the installed DC-to-DC converter based on the identifier. In some embodiments, the applied setting includes one or more of a current limit, a voltage limit, or a power limit. In some embodiments, control circuitry 210 applies the setting based on the received identifier by electrically coupling, using one or more contactors, at least one of a plurality of fuses in a parallel configuration to the installed DC-to-DC converter. In some embodiments, control circuitry 210 selects stored protection and control limits for a load (e.g., an electric vehicle, a solar panel, or a stationary battery converter) from memory 228 of the modular inverter, where the control circuitry 210 selects the stored protection and control limits (e.g., a voltage limit, a current limit, or a power limit) based on the identifier of the load delivered by the installed DC-to-DC converter. In some embodiments, control circuitry 210 applies the setting by applying the selected protection and control limits to the corresponding installed DC-to-DC converter. In some embodiments, control circuitry 210 selects stored protection and control limits based on all connected loads and applies the selected protection and control limits to AC-to-DC inverter 208.

The foregoing is merely illustrative of the principles of this disclosure and various modifications may be made by those skilled in the art without departing from the scope of this disclosure. The above-described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is Claimed is:

1. A modular inverter, comprising:
    a direct current (DC) rail;
    an inverter coupled to the DC rail and capable of being coupled to an alternating current (AC) power source;
    a plurality of bays, each capable of receiving a DC-to-DC converter and connecting the received DC-to-DC converter to the DC rail; and
    control circuitry configured to:
        receive an identifier from an installed DC-to-DC converter in one of the plurality of bays; and
        apply a setting associated with the installed DC-to-DC converter based on the identifier.

2. The modular inverter of claim 1, wherein each of the plurality of bays is capable of receiving a plurality of different types of DC-to-DC converters.

3. The modular inverter of claim 1, further comprising an additional bay comprising a maximum power point tracking (MPPT) charge controller.

4. The modular inverter of claim 3, wherein the MPPT charge controller is configured to be coupled to a solar panel.

5. The modular inverter of claim 1, wherein the inverter is bi-directional.

6. The modular inverter of claim 1, wherein a software communication protocol is used to deliver identifiers from the plurality of bays to the control circuitry.

7. The modular inverter of claim 1, wherein the applied setting comprises one or more of a current limit, a voltage limit, or a power limit.

8. The modular inverter of claim 1, further comprising a plurality of fuses coupled in parallel.

9. The modular inverter of claim 8, wherein the control circuitry is configured to apply the setting based on the identifier by electrically coupling, using one or more contactors, at least one of the plurality of fuses to the installed DC-to-DC converter.

10. The modular inverter of claim 1, wherein the installed DC-to-DC converter is capable of being coupled to a stationary battery converter or an electric vehicle (EV) battery charger.

11. The modular inverter of claim 1, further comprising a plurality of electrical connectors, each configured to connect the DC rail to a received DC-to-DC converter in one of the plurality of bays, wherein each bay is capable of receiving a DC-to-DC converter having a power limit in a range of power limits, and wherein the plurality of electrical connectors is sized to handle a largest power limit in the range of power limits.

12. The modular inverter of claim 1, wherein the identifier identifies a load connected to the installed DC-to-DC converter.

13. The modular inverter of claim 1, further comprising memory configured to store protection and control limits for a stationary battery converter or an electric vehicle battery charger, wherein the control circuitry is configured to select the stored protection and control limits for one of the stationary battery converter or the electric vehicle battery charger based on the identifier, and wherein the applied setting comprises the selected protection and control limits.

14. A method for operating a modular inverter comprising a direct current (DC) rail and a plurality of bays, each capable of receiving a DC-to-DC converter and connecting the received DC-to-DC converter to the DC rail, the method comprising:
    receiving an identifier from an installed DC-to-DC converter in one of the plurality of bays; and
    applying a setting associated with the installed DC-to-DC converter based on the identifier.

15. The method of claim 14, wherein the applied setting comprises one or more of a current limit, a voltage limit, or a power limit.

16. The method of claim 14, wherein applying the setting comprises:
    activating one or more contactors, wherein each contactor is in series with a fuse; and
    electrically coupling at least one of the plurality of fuses to an installed DC-to-DC converter.

17. The method of claim 16, wherein the plurality of fuses is coupled in parallel.

18. The method of claim 14, further comprising:
- storing protection and control limits for a load coupled to the installed DC-to-DC converter in a memory of the modular inverter; and
- selecting the stored protection and control limits for the load coupled to the installed DC-to-DC converter based on the received identifier, wherein the applied setting comprises the selected protection and control limits.

19. A non-transitory computer-readable medium having non-transitory computer-readable instructions encoded thereon that, when executed by a control circuitry of a modular inverter, cause the control circuitry to:
- receive an identifier from an installed DC-to-DC converter in one of a plurality of bays of the modular inverter; and
- apply a setting associated with the installed DC-to-DC converter based on the identifier.

20. The non-transitory computer-readable medium of claim 19, wherein the applied setting comprises one or more of a current limit, a voltage limit, or a power limit.

* * * * *